United States Patent Office 2,884,349
Patented Apr. 28, 1959

2,884,349

REMOVAL OF CALCIUM SULFATE SCALE

Bernard A. Axelrad, Port Sulphur, La., assignor to Freeport Sulphur Company, New York, N.Y., a corporation of Delaware No Drawing. Application July 19, 1956
Serial No. 598,737

10 Claims. (Cl. 134—22)

This invention relates to the removal of calcium sulfate scale from heat transfer surfaces of heaters, radiators, condensers, evaporators and other heat exchange devices, most frequently of tubular construction, in which hard or natural saline waters are processed as for use in the mining of sulfur.

At the present time it is conventional practice to remove this hard scale from such tubes by a physical action referred to as "turbining." In this operation, rotating blades cut away the scale, but this scale is so very hard that even with careful operation over 3 to 4 days duration, the operator cannot prevent the blades from cutting metal away, and hence the process leads to damage to the tubes, requiring their replacement too often with costly new ones.

It has been suggested that the scale be removed by reaction with various chemicals. Acids have not been successful. Although a measure of success has been obtained with other chemicals, as ammonium bicarbonate and sodium hydroxide, all of them leave much to be desired with respect to speed, completeness or economy of removal.

Probably a reason why the action of sodium chloride solution has not heretofore been discovered is that most scale removal operations are of necessity conducted at relatively high temperatures and the action of sodium chloride solutions is poorest at high temperatures. Practical success in the use of sodium chloride solution has been found to require, not only the proper strength and quantity of solution, but the unusual condition that the operation be conducted at temperatures not appreciably higher than atmospheric.

Now it has been discovered that the calcium sulfate scale can be successfully removed from the tubes by the action of a cold aqueous sodium chloride solution. The removal can be accomplished successfully and economically if a 5–20% sodium chloride solution is employed, 10–12% being the preferred concentration range, and the solution is continuously moved over the scale surface as by flowing the solution through the scaled tubes, as for example, at the rate of 3.5 to 8 feet per second at a temperature no higher than 140° F. The rate of removal of calcium sulfate by the said salt solution is surprisingly high until the concentration reaches 3000–4600 mg./l. of calcium sulfate, depending upon the salt concentration used. For example, a solution of 12% NaCl concentration, at a temperature of 90° F., will dissolve 3,800 mg./l. of calcium sulfate in a matter of hours. The volume of solution to be employed accordingly is based on the quantity of calcium sulfate scale to be removed and if the scale is not completely removed when the concentration of calcium sulfate in the solution reaches 3000–4600 mg./l., the solution is replaced by a fresh solution to maintain rapid, efficient removal.

The removal is most effectively carried out at lower temperatures i.e. at or somewhat below atmospheric temperature, the rate of solution of the scale being substantially lower at elevated temperatures.

The thickness of the scale to be removed determines the time required for completion of the cleaning operation, and in any specific operation, the treatment is merely continued until inspection or previous test or experience indicates that the removal has been accomplished.

The solution may be prepared from commercial salt which is low in calcium sulfate content or it may be obtained as a brine from a salt dome underlying a sulfur deposit, and if not already sufficiently low in calcium sulfate content, it can be treated with sodium carbonate and filtered to remove the excess.

In many water heating operations, the scale attaching to heat transfer tubes contains calcium carbonate as well as calcium sulfate. In accordance with a special embodiment of the invention, the scale containing both these components is removed by the continual action of aqueous solutions containing both hydrochloric acid and sodium chloride. Surprisingly the addition of the acid and resulting increase in hydrogen ion concentration does not materially change the action of the solution with reference to calcium sulfate removal, serving merely to attack the calcium carbonate, which the sodium chloride does not remove.

The amount of acid which should be added to the sodium chloride solution, depends of course upon the amount of calcium carbonate in the scale and is directly proportional thereto. The hydrochloric acid reacts with the insoluble calcium carbonate and forms soluble calcium chloride. Practically considered, solutions containing from 0.5 to 10% of HCl can be used.

Conventional corrosion inhibitors, such as pyridine, should be added to the salt-acid solution to prevent attack of the HCl on the metal of the tubes.

Example 1

Heat exchanger tubes theretofore used for the heating of sea water under conditions depositing a scale of calcium sulfate on their inside surfaces in an amount of 110 lbs. and of a thickness of 3/16 of an inch at their outlet ends were connected up with a recycling system for flowing a sodium chloride solution therethrough. An aqueous sodium chloride solution of 12% strength in a quantity of 2760 gallons was pumped at atmospheric temperature through the tubes at the rate of 3.6 ft./sec. When the solution had taken up calcium sulfate to a concentration of 3800 mg./l. the solution was replaced with a fresh sodium chloride solution and the pumping continued until the scale was completely removed.

Example 2

Heat exchanger tubes theretofore used for the heating of sea water under conditions which deposited a scale of calcium sulfate and calcium carbonate amounting to 60 lbs. of the former and 30 lbs. of the latter, are treated with 3,000 gallons of solution containing 12% sodium chloride, 0.5% hydrogen chloride and 0.05% pyridine, by recirculation through the tubes, in which operation the solution is forced through the tubes at the rate of 5 ft./sec. until the scale is removed.

It should be understood that the invention is not limited to the specific conditions and procedures herein disclosed but that it extends to all equivalents which will occur to those skilled in the art upon consideration of the terms and scope of the claims which follow.

I claim:

1. A process for the removal of calcium sulfate scale from heat exchange surfaces which comprises, dissolving said scale in an aqueous solution of sodium chloride of at least about 5% strength in which operation the solution is continuously moved over the surface of the scale being removed.

2. A process for the removal of calcium sulfate scale from heat exchange surfaces which comprises dissolving said scale in an aqueous solution of sodium chloride of from 5 to 20% strength, by weight, at a temperature below 140° F., in which operation the solution is continuously moved over the surface of the scale being removed.

3. A process for the removal of calcium sulfate scale from heat exchange surfaces which comprises flowing over the scale an aqueous solution of sodium chloride of from 5% strength by weight to saturation, at a temperature below 140° F., until the scale is removed.

4. A process for the removal of calcium sulfate scale from heat exchange surfaces which comprises flowing over the scale at about atmospheric temperature an aqueous solution of sodium chloride of from 5% strength by weight to saturation, until the scale is dissolved.

5. A process for the removal of calcium sulfate scale from heat exchange surfaces which comprises flowing over the scale an aqueous solution of sodium chloride of 5% to 20% strength by weight, at a temperature below 140° F., until the scale is dissolved.

6. A process for the removal of calcium sulfate scale from heat exchange surfaces which comprises flowing over the scale an aqueous solution of sodium chloride of 5 to 20% strength, at a temperature below 140° F., in a quantity which removes the scale before the concentration of calcium sulfate in the solution reaches more than 4600 mg./l.

7. A process for removing hard calcium-sulfate-calcium carbonate scale from heat exchange surfaces which comprises continually subjecting the scale on said surfaces to the action of an aqueous solution of sodium chloride and of hydrochloric acid, in which operation the solution is continuously moved over the surface of the scale being removed.

8. A process for removing hard calcium-sulfate-calcium carbonate scale from heat exchange surfaces which comprises flowing an aqueous solution containing 5 to 20% sodium chloride and 0.5 to 10% hydrogen chloride, all by weight, over the surface of the scale, until the scale is removed.

9. The process defined in claim 8 wherein the quantity of the solution used removes the scale before the concentration of the calcium sulfate in the solution exceeds more than 4600 mg./l.

10. A process for the removal of calcium sulfate scale from heat exchange surfaces which comprises, dissolving said scale in a continuously flowing stream of an aqueous solution of sodium chloride of a concentration of a magnitude which increases the solubility of the calcium sulfate in the solution to a level which accomplishes dissolution of the scale at an economically feasible rate.

References Cited in the file of this patent

UNITED STATES PATENTS 2,601,864    Holden _____ July 1, 1952